E. W. SCHELLENTRAGER AND B. E. CLARKSON.
STORAGE BATTERY LOCOMOTIVE.
APPLICATION FILED AUG. 9, 1920.
1,413,686.
Patented Apr. 25, 1922.
4 SHEETS—SHEET 4.
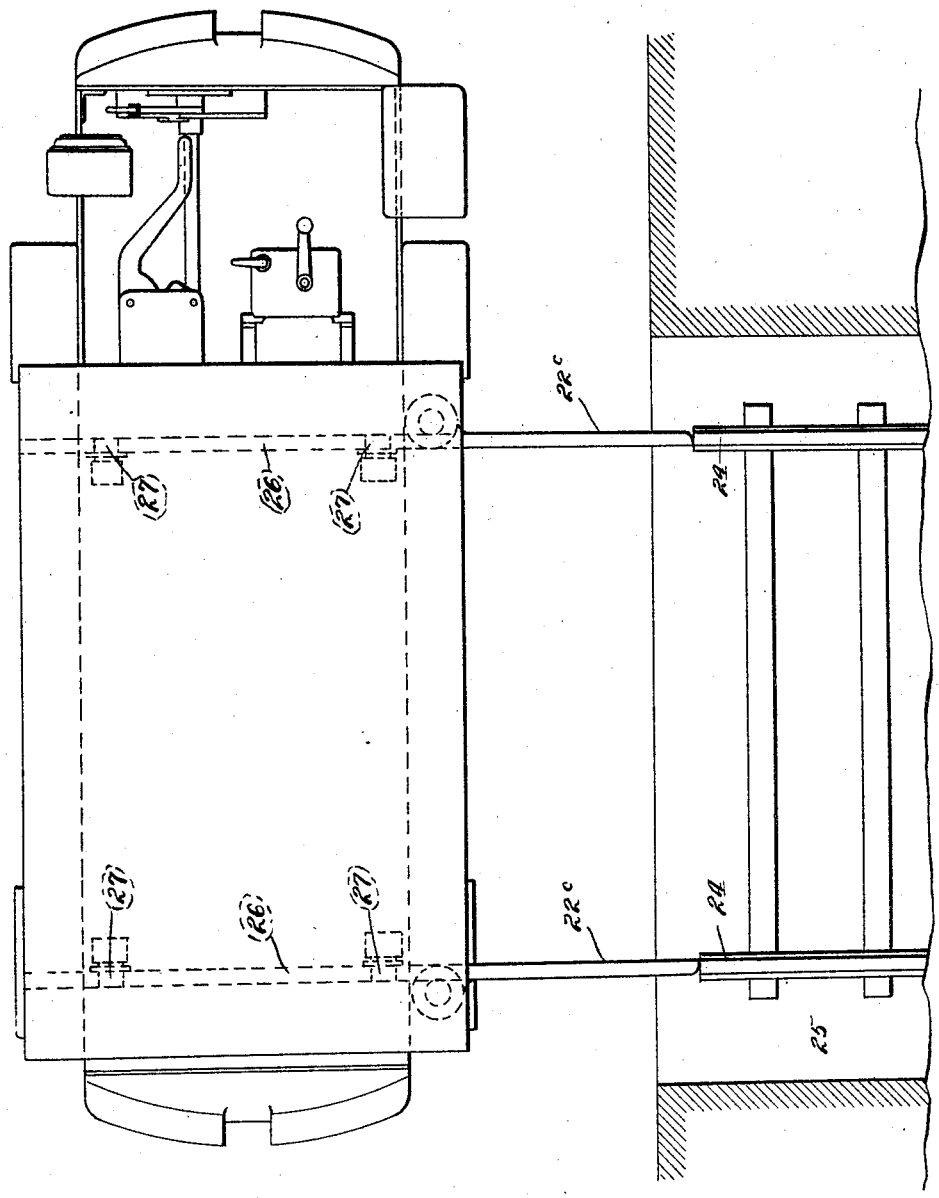

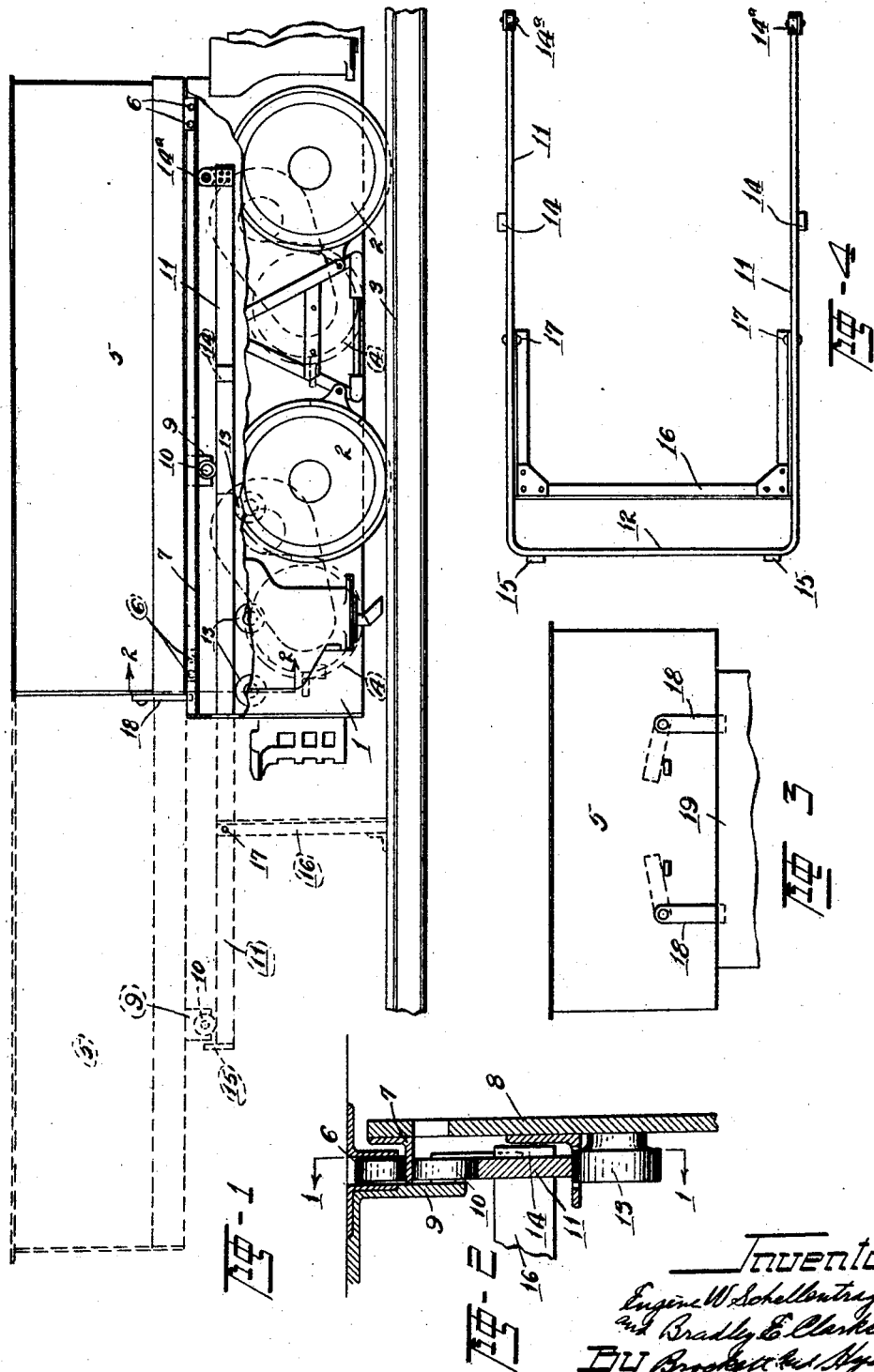

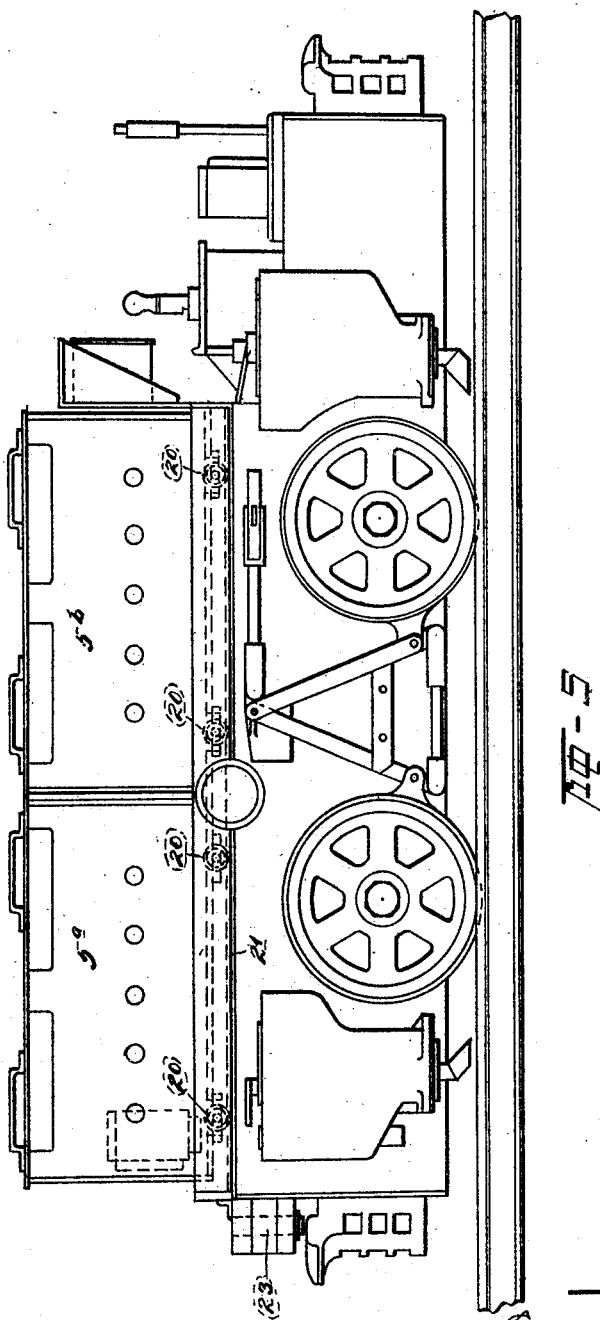

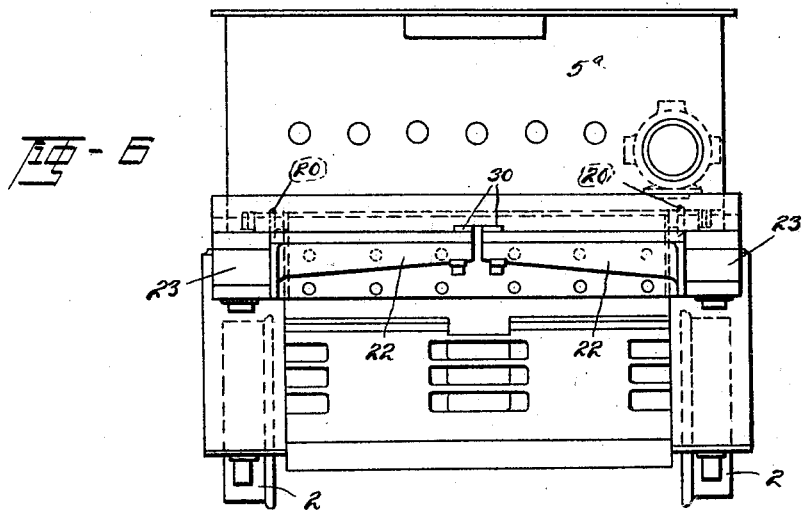
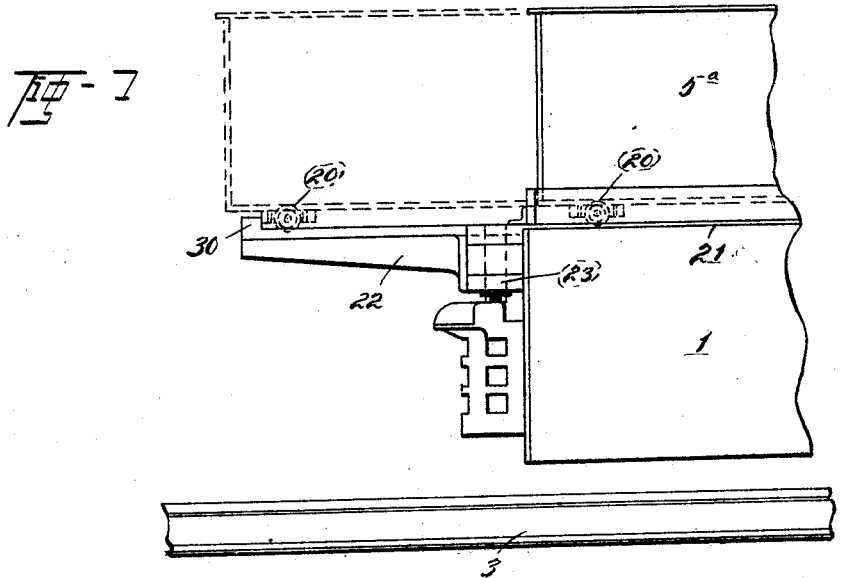

UNITED STATES PATENT OFFICE.

EUGENE W. SCHELLENTRAGER AND BRADLEY E. CLARKSON, OF CLEVELAND, OHIO, ASSIGNORS TO SAMSON D. WRIGHT, OF CLEVELAND HEIGHTS, OHIO.

STORAGE-BATTERY LOCOMOTIVE.

1,413,686. Specification of Letters Patent. Patented Apr. 25, 1922.

Application filed August 9, 1920. Serial No. 402,413.

*To all whom it may concern:*

Be it known that we, EUGENE W. SCHELLENTRAGER and BRADLEY E. CLARKSON, citizens of the United States, residing at Cleveland, in the county of Cuyahoga and State of Ohio, have invented certain new and useful Improvements in Storage-Battery Locomotives, of which the following is a specification.

This invention relates to storage battery locomotives and more particularly to the mounting or support for the battery boxes thereof.

The object of the invention is to provide a mounting or support for the battery box which enables it to be more readily handled either in placing it upon or removing it from the car or to expose the driving motors or other mechanism of the locomotive for repairs or adjustment.

Further objects of the invention are in part obvious and in part will appear more in detail hereinafter.

In the drawings, Fig. 1 represents a side view, partly broken away and in section on the line 1—1, Fig. 2, representing one embodiment of the invention; Fig. 2 is a detail section of one side of the car on the line 2—2, Fig. 1; Fig. 3 is a rear view showing the locking device; Fig. 4 is a plan view of the movable track; Fig. 5 is a side view showing another form of the invention; Fig. 6 is a rear elevation; Fig. 7 is a side view of the rear of the car showing the tracks extended; and Fig. 8 is a plan view illustrating still another form of the invention.

In storage battery locomotives of this type it is frequently necessary to move the battery box or boxes while the car is in the mine, for example, when because of a faulty brush or the like the motor stops, in which case a simple repair made on the spot will prevent taking the locomotive outside of the mine or to a suitable room or place where there is head room enough for a crane to lift the box. Moreover the limited width of many mine passages does not permit turning the box on the car. To overcome these difficulties the present invention provides a slidably adjustable or movable battery box, with the necessary support or mounting therefor, which satisfies all requirements.

Referring to Fig. 1, 1 represents the locomotive frame supported by wheels 2 resting on the tracks 3. The dotted circles 4 represent the two driving motors which are in their customary positions in locomotives of this class. 5 represents the battery box which is of any suitable form for supporting the proper number of battery cells. The front end of the locomotive is at the right, Fig. 1.

Box 5 is suitably constructed and mounted for sliding movement upon the locomotive frame, in a manner to expose the driving motors. This may be accomplished in several ways. In Fig. 1 the box is provided toward its front end and on each side with one or more rollers 6 which travel on fixed tracks, such as angle irons 7, secured to the side frame members 8. It is also provided rearwardly of the rollers 6, such as near the box center, with depending brackets 9 carrying rollers 10 which rest upon movable track members 11. These track members are in the form of bars connected at the rear of the locomotive by a cross piece 12 and indeed, the parts 11 and 12 may be integral with each other. Tracks 11 in turn slide upon rollers 13 journalled upon studs in the frame 1. They are preferably provided with suitable means such as the blocks or abutments 14, which engage the rear wall of the frame to limit their rearward movement and may also be provided with brackets 15 adapted to be engaged by the brackets 9 so that when the box is moved rearwardly from normal position it will pull out or extend the movable tracks with it. This arrangement provides a fixed track upon the locomotive frame and a rearwardly extensible track so that the battery box may be easily rolled rearwardly practically its own length to expose both motors and all other working parts of the car. Tracks 11 may also carry rollers 14ª which lie under the tracks 7 and prevent the tracks 11 from tilting down when withdrawn.

The movable track frame 11, 12 may also carry a U-shaped leg member 16 the two arms of which are pivoted at 17 to the movable track members. This leg member normally folds up within the movable track and is concealed with it in the frame, but when the rearward movement occurs it drops down to the position shown in dotted lines, Fig. 1, when it rests upon the rails 3 and supports the box in its new position.

The locomotive may also be provided with suitable means for locking the box in its normal forward position to prevent it from accidentally sliding rearwardly and possibly injuring a person sitting or standing at the rear end of the locomotive. The drawings show for this purpose two pivoted latches 18 carried by the box and normally hanging with their lower ends in front of a cross bar 19 of the frame, but which can be turned to the dotted line position, Fig. 3 to release the box when desired.

Figs. 5, 6 and 7 show another arrangement in which the battery is divided and is carried in two separate boxes 5ª, 5ᵇ, each of which has rollers 20 travelling upon fixed tracks 21 of the frame. At the rear of the frame are located two cantilever track arms 22 pivoted upon vertical axes 23 at the sides of the frame. The normal position of these arms is shown in Fig. 6 but when desired they may be turned out as shown in Fig. 7 and form extensions of the tracks 21. To expose the rear motor the box 5ª alone is moved rearwardly, while by moving both boxes 5ª, 5ᵇ rearwardly the forward motor is exposed. 30 are limiting stops upon the arms.

Similar track arms 22ᶜ, in another form of the invention may be pivoted both upon the same side of the car, as shown in Fig. 8, forming track extensions to be extended laterally to a portable track frame 24 upon the floor of a room 25 at one side of the passage. The locomotive, in this case, has laterally extending fixed tracks 26 and the box has rollers 27 enabling said box to be rolled laterally either to gain access to the motors or to enable battery boxes to be changed by rolling another box upon the car from a room at the other side of the car across a duplicate pair of track arms at the other side of the car.

What we claim is:

1. A storage battery locomotive comprising a frame, a battery box, and means carried by said frame and extensible through a horizontal plane for supporting and guiding said box for bodily movement out of its normal position on the locomotive.

2. A storage battery locomotive, comprising a frame, a battery box thereon, tracks upon said frame and extensible through a horizontal frame, and rollers carried by the box and traveling on said tracks.

3. A storage battery locomotive, comprising a frame, a battery box thereon, tracks upon said frame, and rollers carried by the box and traveling on said tracks, portions of said tracks being extensible through a horizontal plane beyond the locomotive body.

4. A storage battery locomotive, comprising a frame, a battery box thereon, tracks upon said frame, and rollers carried by the box and traveling on said tracks, said tracks including portions which may be moved through a horizontal plane to either of two positions; in one of which they are withdrawn within, and in the other of which they extend beyond the locomotive body.

5. A storage battery locomotive, comprising a frame, a battery box, and supporting means therefor normally withdrawn toward the frame and extensible through a horizontal plane beyond the same.

In testimony whereof we hereby affix our signatures.

EUGENE W. SCHELLENTRAGER.
BRADLEY E. CLARKSON.